United States Patent
Mori et al.

(10) Patent No.: US 6,824,724 B2
(45) Date of Patent: Nov. 30, 2004

(54) BLADDER AND TIRE PRODUCING METHOD

(75) Inventors: Hiroyuki Mori, Toyonaka (JP); Yozaburo Takayama, Nishinomiya (JP); Kazuhisa Fujisawa, Kobe (JP); Hisashi Mitamura, Takasago (JP); Kazuto Okada, Kobe (JP); Naoya Fujiwara, Kobe (JP); Eiichiro Yoshikawa, Kobe (JP); Takayuki Kogishi, Kobe (JP)

(73) Assignees: Teijin Limited, Osaka (JP); Kabushiki Kaisha Kobe Seiko Sho, Kobe (JP)

( * ) Notice: Subject to any disclaimer, the term of this patent is extended or adjusted under 35 U.S.C. 154(b) by 182 days.

(21) Appl. No.: 10/285,426

(22) Filed: Nov. 1, 2002

(65) Prior Publication Data

US 2003/0122284 A1 Jul. 3, 2003

(30) Foreign Application Priority Data

Nov. 2, 2001 (JP) .......................... 2001-337319
Jun. 19, 2002 (JP) .......................... 2002-178271

(51) Int. Cl.$^7$ .......................... B29C 35/02; B29D 30/06
(52) U.S. Cl. .......................... 264/315; 425/52
(58) Field of Search .......................... 264/315, 326; 425/43, 52; 249/65

(56) References Cited

U.S. PATENT DOCUMENTS

| | | |
|---|---|---|
| 1,286,107 A | 11/1918 | Renner |
| 1,378,172 A | 5/1921 | Gostlin |
| 1,535,647 A | 4/1925 | Brennan |
| 1,544,217 A | 6/1925 | Castricum |
| 1,607,356 A | 11/1926 | McMahan |
| 1,612,024 A | 12/1926 | Jacobs |
| 1,910,128 A | 5/1933 | Semler |
| 2,305,412 A | 12/1942 | Frolich et al. |
| 2,476,831 A | 7/1949 | Spencer |
| 2,582,715 A | 1/1952 | Murray |
| 3,932,088 A * | 1/1976 | Harada et al. ................. 425/52 |
| 5,062,781 A * | 11/1991 | Szyms et al. ................. 425/52 |

FOREIGN PATENT DOCUMENTS

JP   2000-317942   11/2000

OTHER PUBLICATIONS

J. A. Nehlig, International Tire Exhibition and Conference, pp. 1–8, "Fabric Reinforced Curing Bladders", Sep. 12, 13 and 14, 2000.

* cited by examiner

Primary Examiner—James P. Mackey
(74) Attorney, Agent, or Firm—Oblon, Spivak, McClelland, Maier & Neustadt, P.C.

(57) ABSTRACT

An object of the present invention is to provide a bladder which is unlikely to have a shapal variation along the inner wall surface of the tire and can satisfactorily extend along the inner wall surface of the tire. An inventive bladder is used to press the inner wall surface of the tire by a pressurized heating medium during the vulcanization of a green tire and is comprised of a fabric layer (purl stitched fabric layer 12) and rubber layers (silicone rubber layers 11, 13) placed one over another. Elongation rates of the fabric layer in warp direction and in weft direction both exceed 15% and satisfy: $0.4 \leq$ elongation rate in weft direction/elongation rate in warp direction $\leq 6.0$. Since the fabric layer has good extensibility, it can elongate with the rubber layers.

15 Claims, 6 Drawing Sheets

BLADDER AND TIRE PRODUCING METHOD

BACKGROUND OF THE INVENTION

1. Field of the Invention

The present invention relates to a bladder used to vulcanize a green tire for pushing the tire to open toward a mold by means of a pressurized heating medium and also to a tire producing method using such a bladder.

2. Description of the Related Art

One tire is produced by joining members including a carcass, beads, side walls, a belt and a tread into a green tire, setting the green tire in a mold, and applying heat and pressure to the green tire for a predetermined time to vulcanize it.

Figure 4:
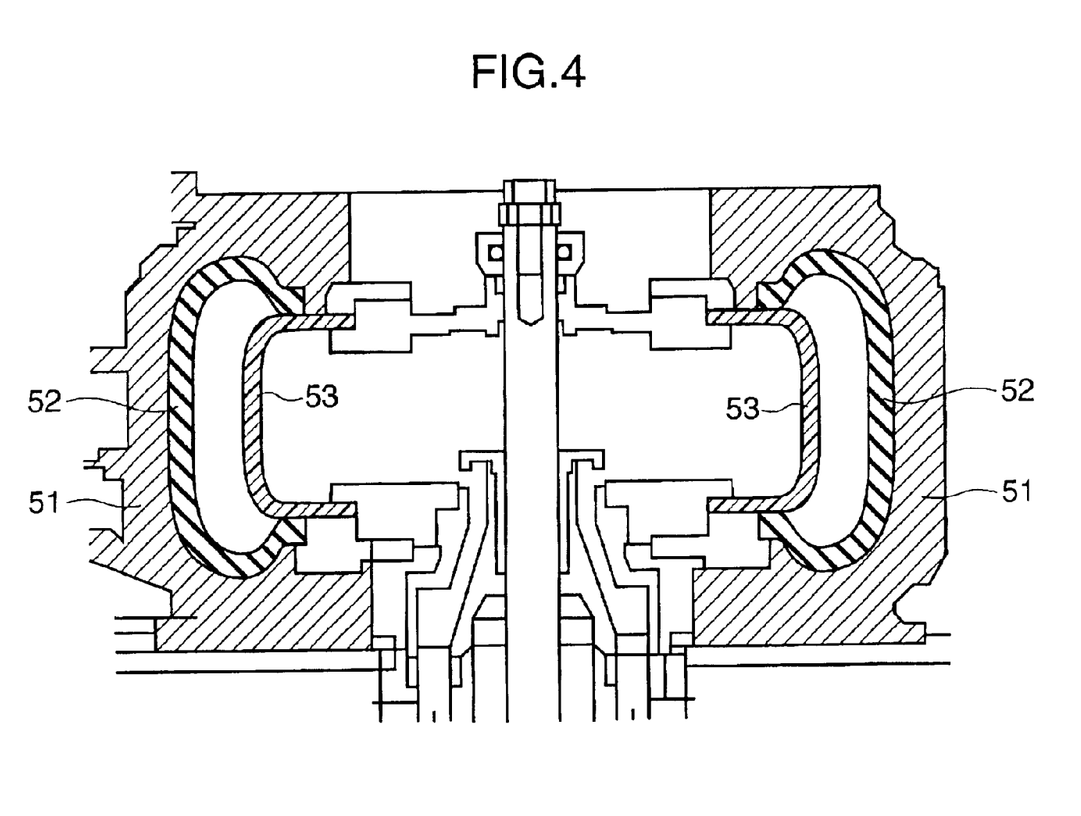
FIG. 4 is a section showing a state where a prior art bladder is placed inside a green tire set in a mold.
Figure 5:
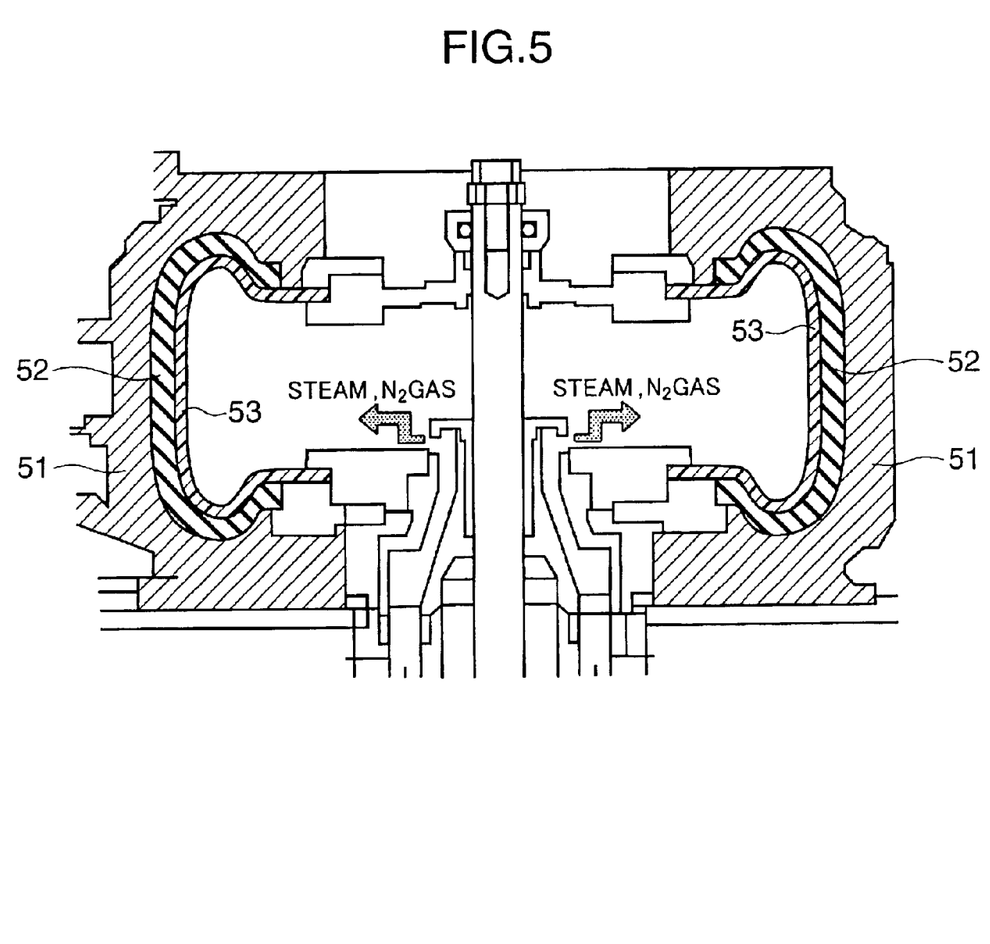
FIG. 5 is a section showing a state where the green tire is pressed against the mold by the prior art bladder.

Upon vulcanization, a bladder 53 is placed inside a green tire 52 set in a mold 51 (see FIG. 4 which is a section showing a state where the bladder 53 is placed inside the green tire 52 set in the mold 51). By supplying a high-temperature and high-pressure heating medium to the inside of the bladder 53, the bladder 53 is expanded to press the green tire 52 against the inner wall surface of the mold 51 while opening the green tire 52 (see FIG. 5 which is a section showing a state where the green tire 52 is pressed against the mold 51 by the bladder 53). In this way, a tread pattern is engraved in the outer surface of the green tire 52, and the green tire 52 is vulcanized by being heated by the heating medium and the mold. A mixed fluid of steam and $N_2$ gas of 180 to 200° C. or the like is generally used as the heating medium.

The bladder needs to sufficiently expand and push the green tire from inside during vulcanization, whereas it is desired to be smaller than a spacing between the beads of the tire when the green tire is set in the mold and when the tire is taken out after being produced. Accordingly, bladders made of rubbers such as a butyl rubber having excellent flexibility have been used (prior art (1)).

However, the bladders need to have a thickness of about 4 to 6 mm in order to provide sufficient strength only by the rubber material. This results in a poor thermal conductivity, thereby presenting a problem of a longer vulcanization time.

Although the bladder should have such a shape (hereinafter, referred to as "profile") as to be closely in contact with the inner wall surface of the tire and uniformly press the tire during vulcanization, rubbers generally used as a material for the bladder possess a property of being cured in a high temperature environment. Thus, while the vulcanization of the tires is repeated, the bladder is cured to reduce the elongation rate of the bladder. As the elongation rate decreases, a pressing force by expansion is reduced, causing the profile to vary. If the profile is lightly variable, it does not cause any problem in the quality of the tires. However, in the case of the thick bladder as in the prior art (1), the variation of the profile becomes notable after the bladder is used a relatively small number of times. Thus, the bladder is obliged to be exchanged at an earlier stage (for example, the bladder is exchanged after vulcanization is repeated 300 to 400 tires in the case of automotive tires), which causes a problem of reduced productivity.

In view of the above, there has been proposed a thinner bladder by reinforcing the butyl rubber by tire cords made of aramid (prior art (2): U.S. Pat. No. 5,062,781). However, this bladder does not expand sufficiently since the tire cords hardly elongate. Thus, a satisfactory profile is difficult to form.

In addition, the bladder of prior art (2) has low shape flexibility and it is difficult for this bladder to constantly extend along the inner wall surface of the tire in a satisfactory manner. Thus, even if the bladder is formed with a gas escaping groove, gas remaining between the green tire and the bladder may not satisfactorily escape.

On the other hand, Japanese Unexamined Patent Publication No. 2000-317942 discloses a bladder made of a knitted or woven fabric from aramid fibers and formed beforehand into the same shape as the inner wall surface of a vulcanized tire (prior art (3)). This bladder is used as follows. First, the bladder is folded into a smaller piece and placed inside the green tire, and is expanded by the pressure of a heating medium to press the green tire during vulcanization. Since aramid fibers and the like are low extensible materials which are unlikely to change properties in a high-pressure environment, this bladder displays an effect that the profile of the inner wall surface of the tire is fairly stable even after vulcanization is repeated a large number of times. This Publication No. 2000-317942 also discloses a bladder made of an aramid-fiber fabric coated with a silicone resin or the like and having about the same air-tightness as the bladder made of butyl rubber (prior art (4)).

SUMMARY OF THE INVENTION

The present invention is directed to a bladder used to press the inner wall surface of a tire by means of a pressurized heating medium during the vulcanization of a green tire, comprising at least one rubber layer and at least one fabric layer, wherein elongation rates of the fabric layer in warp direction and in weft direction both exceed 15% and satisfy following equation (1):

$$0.4 \leq \text{elongation rate in weft direction/elongation rate in warp direction} \leq 6.0 \tag{1}.$$

The present invention is also directed to a tire producing method using the inventive bladder, comprising the steps of placing the inventive bladder inside a green tire set in a mold, and supplying a pressurized heating medium to the inside of the bladder to vulcanize the green tire while pressing it against the inner wall surface of the mold by the bladder.

DESCRIPTION OF THE PREFERRED EXAMPLES

Although various bladders have been conventionally proposed as described above, there is a demand for a bladder whose profile is difficult to vary and which needs to be exchanged with a reduced frequency.

Accordingly, an object of the present invention is to provide a bladder whose profile hardly varies with respect to the inner wall surface of a tire even after a larger number of tires are vulcanized so as to reduce an exchange frequency.

A bladder according to the present invention is adapted for pressing the inner wall surface of a tire by means of a pressurized heating medium when a green tire is vulcanized and includes at least one rubber layer and at least one fabric layer, wherein elongation rates of the fabric layer in warp direction and in weft direction both exceed 15% and a ratio of elongation rate in weft direction to elongation rate in warp direction (hereinafter may be also referred to as weft/warp elongation rate ratio) takes a value between 0.4 and 6.0.

Since the fabric layer placed on the rubber layer is extendible, the rubber layer is reinforced by this fabric layer without having its extensibility impaired, and the durability of the bladder can be improved. Since the fabric layer is extensible together with the rubber layer, the profile does not largely deviate from the inner wall surface of the tire during vulcanization and, therefore, the bladder can press the tire in a well-balanced manner. Since being reinforced by the fabric layer, the rubber layer can be made thinner, thereby making the entire bladder thinner (e.g. 2 to 6 mm). This can better the thermal conductivity of the bladder and shorten a vulcanization time. As a result, the thermal degradation of the bladder is suppressed, thereby reducing an exchange frequency of the bladder and improving tire productivity.

For example, in the prior art (3), the aramid-fiber fabric needs to be formed into the substantially same shape as the inner wall surface of the vulcanized tire beforehand. However, since the inventive bladder is made into the shape of the inner wall surface of the tire by being expanded, detailed shape designing is not necessary.

If the fabric layer is placed on the rubber layer only for the reinforcement of the rubber sheet, any fabric may be used. If a fabric is poorly extensible, it hinders the elongation of the rubber sheet when being placed on the rubber sheet, thereby making it difficult to form a satisfactory profile. In this respect, elongation rates of the fabric layer in warp and weft directions are preferably equal to or larger than 25%, more preferably equal to or larger than 50%. The elongation rates are obtained by JIS L 1018.

If the fabric layer having quite a good extensibility is used, it is sufficient to form the bladder into a cylindrical shape or a lantern shape in accordance with tire size and the bladder can be easily produced.

The extensibility of the fabric in warp and weft directions are preferably well-balanced in order to obtain a more uniform profile during vulcanization. Specifically, a weft/warp elongation rate ratio is preferably 0.7 to 1.7, more preferably 0.8 (inclusive) to 1.4 (inclusive). The weft/warp elongation rate ratio is calculated by following equation (3):

weft/warp elongation rate ratio=ratio of elongation rate in weft direction/elongation rate in warp direction (3).

The fabric layer may be arranged in the bladder such that the warp direction of the fabric layer is in parallel with the longitudinal direction of the cylindrical bladder, the weft direction of the fabric layer is in parallel with the longitudinal direction or the warp and weft directions of the fabric layer are oblique to the longitudinal direction.

The fabric layer is preferably made of a knitted fabric because the knitted fabric has good extensibility. Even if the knitted fabric is made using fibers having poor extensibility (e.g. aramid fibers), sufficient extensibility can be displayed by the knitted structure. Thus, if the fabric layer is made by knitting fibers having good heat resistance and weather resistance, it is difficult to degrade and displays sufficient extensibility.

The knitted fabric is preferably made by a flat knit, most preferably by purl stitches a purl stitched fabric is most preferable. The purl stitched fabric has good extensibility and is isotropic by elongating at substantially equal rates in warp (longitudinal) and weft (lateral) directions. Thus, the well-extensible and isotropic purl stitched fabric can satisfactorily elongate together with the rubber layer and the profile is not deviated from the inner wall surface of the tire during vulcanization. The elongation rate in weft direction is considerably larger than the one in warp direction in a plain stitched fabric. Further, a rib stitched fabric has an elongation rate in weft direction larger than the one in warp direction. Either fabric is elongated in warp and weft directions in an unbalanced manner. Thus, there is a danger of forming a slightly deviated profile during vulcanization. However, the purl stitched fabric has particularly good extensibility and a stretch-back property (property of returning to an initial shape after being stretched) and can be elongated at substantially equal rates in warp and weft directions as described above. Thus, the fabric layer made of the purl stitched fabric does not impair the stretch-back property of the rubber layer (rubber sheet, etc.) and can satisfactorily extend along the inner wall surface of the tire together with the rubber layer.

The fabric may be made by either the circular knit or the flat knit, but the circular knit is more preferable than the flat knit. This is because the bladder is in the form of a circular tube. Thus, if the cylindrical circular knitted fabric is used as the knitted fabric (fabric layer), the bladder produced has no seam in the fabric layer and is uniform as a whole. This results in better durability of the bladder. In this case, the fabric layer is arranged such that its warp direction is parallel with the longitudinal direction of the cylindrical bladder.

If the fabric layer is made by the circular knit by alternately arranging front stitches and back stitches row by row, the circular knitted purl stitched fabric can be obtained. This fabric is more preferable since it elongates equally in warp and weft directions and no seam is made in the fabric layer of the bladder.

Multi-layer modes of the rubber and fabric layers in the inventive bladder include, for example, the one in which the rubber layers are placed on both surfaces of the fabric layer (three-layer structure) and the one in which the rubber layer is placed on one surface of the fabric layer (two-layer structure). Additional modes may include ones in which the rubber layers and the fabric layers are alternately placed one over another to form a structure of four or more layers and ones in which the rubber layer(s) is/are provided on an aggregate of two or more fabric layers placed one over another. In order to prevent the entire bladder from becoming too thick, it is recommendable to place not too many layers one over another. In such multi-layer structures, it is preferable to embed the fabric layer in the rubber layer. This is because the rubber layer and the fabric layer are adhered to each other very well.

Among the above multi-layer modes, the three-layer structure is preferable since the upper and lower rubber layers are made unitary through the stitches of the fabric layer, thereby forming a firm rubber/fabric composite sheet.

In the above two-layer structure, the adhesion of the rubber layer and the fabric layer on a boundary surface is particularly good since air between the fabric layer and the rubber layer escapes well through the fabric layer and does not remain in the multi-layer sheet of the fabric layer and the rubber layer when the fabric layer and the rubber layer are placed one over the other during the production of the bladder. In addition, the production of the bladder is easier since no special attention needs to be paid to the escape of the air between the layers. In the case of the two-layer structure, a coating member (silicone resin, fluorocarbon rubber, etc.) may be provided for the protection of the outer surface of the fabric layer.

Next, a gas escaping property between the green tire and the bladder during the vulcanization of the tire is described.

In the case that the knitted fabric is used as the fabric layer of the bladder, if the knitted fabric (fabric layer) of the bladder is facing the mold, gas residual between the bladder and the green tire is diffused through the unevenness of the outer surface of the knitted fabric itself and escapes to outside from bead end portions of the tire without forming large air bubbles. As a result, the bladder satisfactorily extends along the inner wall surface of the tire.

In the case that the knitted fabric is likewise used as the fabric layer of the bladder, if the rubber layer of the bladder (for example, the bladder of three-layer structure of rubber sheet/knitted fabric (fabric layer)/rubber sheet) is facing the mold, the unevenness of the knitted fabric (fabric layer) is transferred to the rubber layer at the mold side to thereby form countless projections and recesses, i.e. unevenness, in the surface (outer surface) of the bladder facing the mold when the bladder is pressed against the inner wall surface of the tire during vulcanization. Similar to the above case, gas residual between the bladder and the green tire is diffused through this unevenness and escapes to outside from bead end portions of the tire. As a result, the bladder satisfactorily extends along the inner wall surface of the tire. The use of the purl stitched fabric as the fabric layer is particularly preferable since projections and recesses (unevenness) of suitable dimensions in thickness direction are formed in the outer surface of the bladder.

If the knitted fabric is used as the fabric layer of the inventive bladder, no gas escaping groove needs to be formed in the outer wall surface of the bladder unlike the prior art since the gas is satisfactorily diffused as described above.

In the present invention, when the fabric layer is a knitted fabric, stitch density is preferably 5 to 25 courses/2.54 cm and 5 to 25 wales/2.54 cm.

No satisfactory stretch-back property may be displayed if the fabric is made of considerably large stitches, whereas extensibility may be poor if the stitches are too dense. More preferably, the stitch density is 10 or more courses/2.54 cm, 20 or less courses/2.54 cm, 10 or more wales/2.54 cm, and 20 or more wales/2.54 cm.

Further, the course density and the wale density are preferably equal or approximate because forces and rates of elongation of the fabric layer in warp and weft directions are more likely to be equal. Most preferably, the course density and the wale density are equal.

In addition, the fabric layer is made from high-strength fibers of 17 cN/dtex or higher in the present invention.

Fibers (threads) forming the fabric layer are required to have a strength sufficient not to be easily fractured even upon being largely elongated. In this respect, the fibers preferably have a strength of 17 cN/dtex or higher, more preferably a strength of 20 cN/dtex (measurement method by JIS L 1070 (method for measuring a tensile strength). Generally, threads having a high tensile strength tend to have poor extensibility. However the threads forming the fabric layer themselves may not be extensible since the fabric layer displays satisfactory extensibility by using the knitted fabric (preferably purl stitched fabric) as such.

The high-strength fibers include aramid fibers, more specifically polyparaphenylene isophthalamide fibers, polyparaphenylene terephthalamide fibers, copolymer fibers of para-aramid fibers and meta-aramid fibers, para-aramid fibers obtained by copolymerizing an aromatic ether, e.g. 3,4'-diaminodiphenylether. Polyparaphenylene benzobisoxazole fibers, polyimide fibers, all aromatic polyester fibers, polyetherimide fibers, polyether ether ketone fibers and fibers obtained by mixing these fibers may be counted as other high-strength fibers.

Among the above fibers, polyparaphenylene terephthalamide fibers (e.g. Kevlar® produced by Dupont), para-aramid fibers obtained by copolymerizing 3,4'-diaminodiphenylether (Technora® produced by Teijin) and polyparaphenylene benzobisoxazole fibers (Zylon® produced by Toyobo). Among these, para-aramide fibers obtained by copolymerizing 3,4'-diaminodiphenylether (copoly paraphenylene-3,4'-oxydiphenylene terephthalamide fibers [structural formula is shown below] (Technora® produced by Teijin) are particularly preferable since they have excellent heat resistance and are difficult to degrade even if being repeatedly heated during vulcanization and are easily applicable for the draft zone system spinning.

Formula 1:

"m" AND "n" ARE INTEGERS EQUAL TO OR MORE THAN 1.

"m" AND "n" COULD BE THE SAME OR COULD BE DIFFERENT FROM EACH OTHER.

The high-strength fibers may be long fibers or short fibers.

The fabric layer is preferably made from spun yarns made of high-strength fibers, false twist yarns made of high-strength fibers by the draft zone system spinning method or composite yarns of these yarns.

If the fabric layer is made from the spun yarns and the false twist yarns made by the draft zone system spinning method as above, the fabric layer can be satisfactorily adhered to resin by the anchor effect of fluffing on the outer surfaces of the yarns. Particularly, the false twist yarns made by the draft zone system spinning method are preferable since the strength of the fibers is satisfactorily kept in addition to the good anchor effect.

The materials for the rubber layer include a butyl rubber, a modified butyl rubber, an ethylene propylene rubber, an ethylene propylene diene rubber (EPDM), a nitrile butadiene rubber, a hydrogenated nitrile butadiene rubber, a styrene butadiene rubber, a chloroprene rubber, an isoprene rubber, an epichlorohydrin rubber, an acrylic rubber, a chlorosulfonated polyethylene, a silicone rubber, a fluorocarbon rubber, etc. These rubber materials may be used singly or in combination. Among these, silicone rubber, hydrogenated nitrile butadiene rubber and fluorocarbon rubber are particularly preferable due to their excellent heat resistance.

A tire producing method according to the present invention comprises the steps of placing the bladder inside the green tire set in the mold, and supplying the pressurized heating medium to the inside of the bladder to vulcanize the green tire while pressing it against the inner wall surface of the mold by the bladder.

Since the inventive bladder has satisfactory extensibility and there is no large difference between the elongation rates in warp and weft directions as described above, the green tire can be pressed in a well-balanced manner. Further, if the knitted fabric is used as the fabric layer, countless projections and recesses are formed in the outer surface of the bladder, enabling the satisfactory escape of the gas. Therefore, a substantially uniformly vulcanized tire can be obtained.

EXAMPLES OF THE INVENTION

First Example

Figure 1:
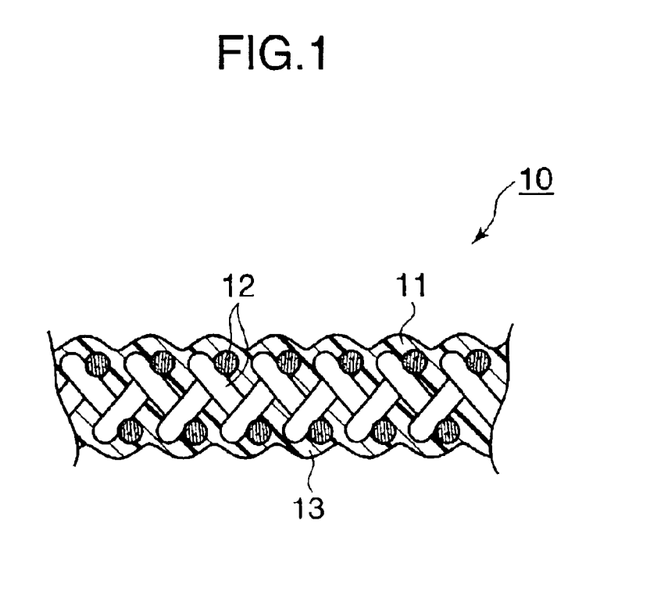
FIG. 1 is a partial section of a bladder according to a first example of the invention.

FIG. 1 is a partial section of a bladder according to a first example of the present invention.

This bladder 10 has a three-layer structure in which silicon rubber layers 11, 13 are integrally placed on the front and rear surfaces of a flat knitted purl stitched fabric layer 12, and the thickness thereof is 2 mm. The purl stitched fabric layer 12 is made by the flat knit of the purl stitches of aramid fibers (thickness: 440 dtex, tensile strength: 25 cN/dtex) at a course density of 15 courses/2.54 cm and a wale density of 15 wales/2.54 cm, and its elongation rate in warp direction, elongation rate in weft direction and weft/warp elongation rate ratio are 200%, 230% and 1.15.

Next, a method for producing the bladder 10 of the first example is described.

Two silicone rubber sheets and a purl stitched fabric are prepared. They are placed one over another in the order of the silicone rubber sheet→the purl stitched fabric→the silicone rubber sheet and pressed, thereby forming a three-layer sheet having a thickness of 2 mm. This three-layer sheet is wound around a core, and the silicone rubber is arranged at a position corresponding to a clamping portion. Subsequently, the core part is set in a lower outer mold, the upper and lower outer molds are clamped, and vulcanization is applied using a press. Thereafter, the upper and lower outer molds are opened to take the core portion out, and a molded product (bladder 10) is obtained by dividing the core section. During vulcanization, the two silicone rubber sheets of the three-layer sheet partially flow into clearances between the stitches of the purl stitched fabric to make the silicone rubber sheets integral to the fabric layer, and are cross-linked in this state. Accordingly, the bladder 10 has a three-layer structure (rubber layer 11—purl stitched fabric layer 12—rubber layer 11) in which the three layers 11, 12, 13 are made integral to each other by the rubber layers 11, 13 flowed into the clearances between the stitches of the purl stitched fabric layer 12.

A method for vulcanizing a tire using the bladder 10 is described below.

Figure 2:
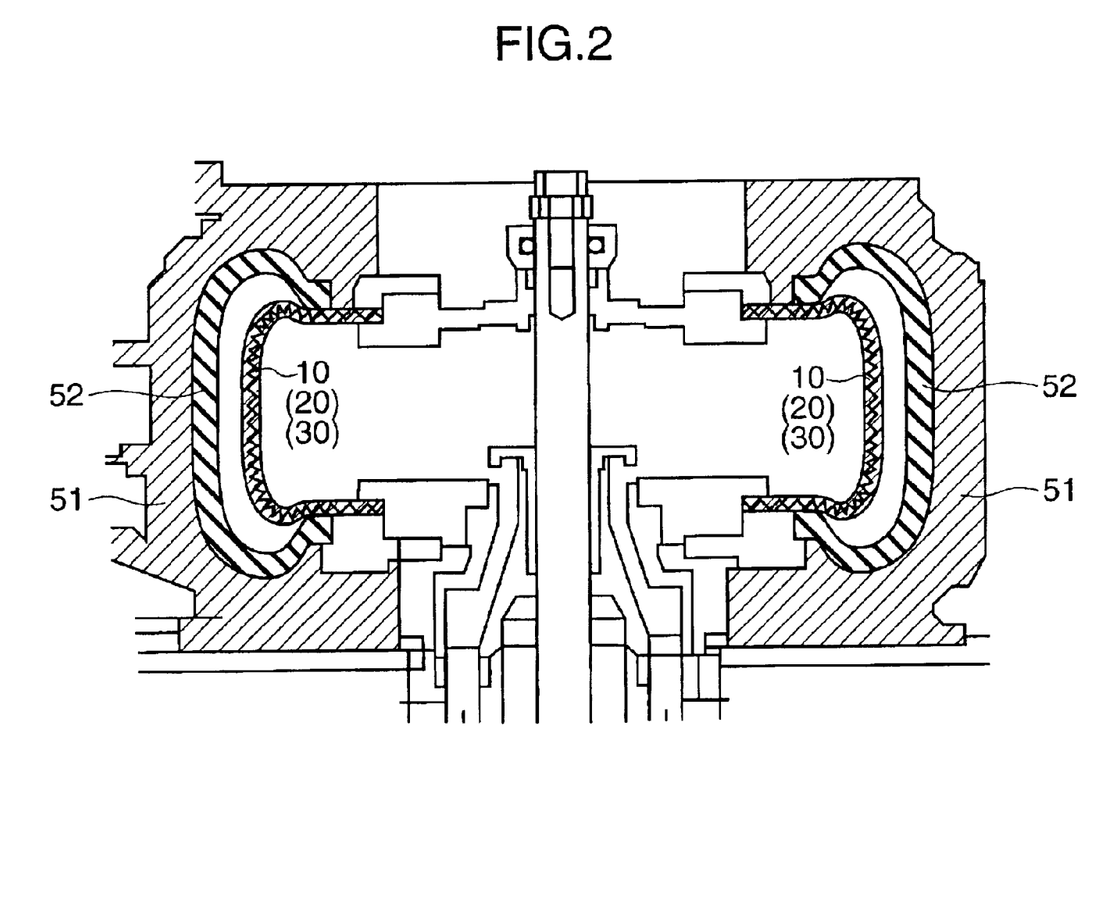
FIG. 2 is a section showing a state where the bladder of the first example is placed inside a green tire set in a mold.

Similar to the prior art, the bladder 10 is placed inside a green tire 52 set in a mold 51 of a vulcanizing apparatus (see FIG. 2 which is a section showing a state where the bladder 10 is placed inside the green tire 52 set in the mold 51).

Subsequently, the bladder 10 is developed and expanded by supplying a heating medium of high temperature and high pressure (185° C., steam of 14 kg/cm$^2$ and N$_2$ gas of 24 kg/cm$^2$) to the inside of the bladder 10, whereby the green tire 52 is pressed against the inner wall surface of the mold 51 (see FIG. 3 which is a section showing a state where the green tire 54 is pressed against the mold 51 by the bladder 10) and vulcanized. Since the bladder 10 is satisfactorily elongated, there is hardly any variation in the profile along the inner wall surface of the tire. Before being elongated, the rubber layer 11 of the bladder 10 at the mold side is smooth. However, when the bladder 10 is pressed against the inner wall surface of the tire, the unevenness of the purl stitched fabric layer 12 of the bladder 10 is transferred to the rubber layer 11 at the mold side, thereby forming countless fine projections and recesses in the outer surface of the bladder 10. Since gas between the green tire 52 and the bladder 10 escapes to outside while being diffused through this unevenness, the inner wall surface of the tire can be pressed in a well-balanced manner. In addition, since the bladder 10 has a small thickness of 2 mm, heat of the heating medium can be satisfactorily transmitted to the green tire 52. Thus, the green tire 52 can be vulcanized within a short period of time. For example, a vulcanization time can be shortened by about 23%, for example, as compared to a bladder having a thickness of 4 mm.

Thereafter, the supply of the heating medium is stopped to reduce to normal pressure, and the vulcanized tire are taken out of the vulcanizing apparatus.

Subsequently, new green tires 52 are vulcanized in a similar manner. Although the bladder 10 is repeatedly used, it keeps its initial stretch-back property over a long time since being reinforced by the purl stitched fabric layer 12. Even after the bladder 10 is subjected to vulcanization a large number of times, there is hardly any variation in the profile along the inner wall surface of the tire and, therefore, the green tire can be satisfactorily pressed. As a result, a bladder exchanging frequency can be reduced, leading to improved productivity and reduced production costs.

Second Example

Figure 6:
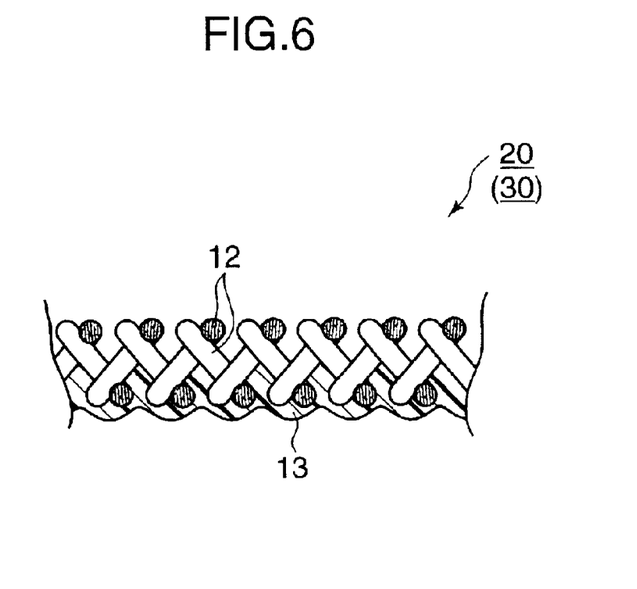
FIG. 6 is a partial section of a bladder according to a second or third example of the invention.

FIG. 6 is a partial section of a bladder according to a second example of the present invention. This bladder 20 has a two-layer structure in which a silicon rubber layer 13 is integrally placed on one surface of a flat knitted purl stitched fabric layer 12, and the thickness thereof is 2 mm. Similar to the purl stitched fabric of the first example, the flat knitted purl stitched fabric layer 12 of the second example is made from aramid fibers (thickness: 440 dtex, tensile strength: 25 cN/dtex) at a course density of 15 courses/2.54 cm and a wale density of 15 wales/2.54 cm, and its elongation rate in warp direction, elongation rate in weft direction and weft/warp elongation rate ratio are 200%, 230% and 1.15. Although the purl stitched fabric layer 12 is concealed by the rubber layers 11, 12 in the first example, the purl stitched fabric layer 12 is partly embedded in the rubber layer 13 in this bladder 20 and a side opposite thereof from the embedded side is exposed to display the unevenness of the fabric.

Next, a method for producing the bladder 20 of the second example is described.

One silicone rubber sheet and one purl stitched fabric are prepared. They are placed one over another to form a two-layer sheet having a thickness of 2 mm. In the first example, when the purl stitched fabric is held between the two rubber sheets, attention needs to be paid to the escape of air between their interfaces. However, since air between the interfaces of the silicone rubber sheet and the purl stitched fabric can easily escape through the purl stitched fabric in the second example, air hardly remains at the interfaces, presenting good interface adhesion between the silicone rubber layer 13 and the purl stitched fabric layer 12.

Subsequently, this two-layer sheet is wound around a core with the purl stitched fabric surface faced outward, and the silicone rubber is arranged at a position corresponding to a clamping surface. Then, similar to the first example, the core part is set in a lower outer mold, the upper and lower outer molds are clamped, and vulcanization is applied using a press. Thereafter, the upper and lower outer molds are opened to take the core portion out, and a molded product (bladder 20) is obtained by dividing the core section.

Figure 3:
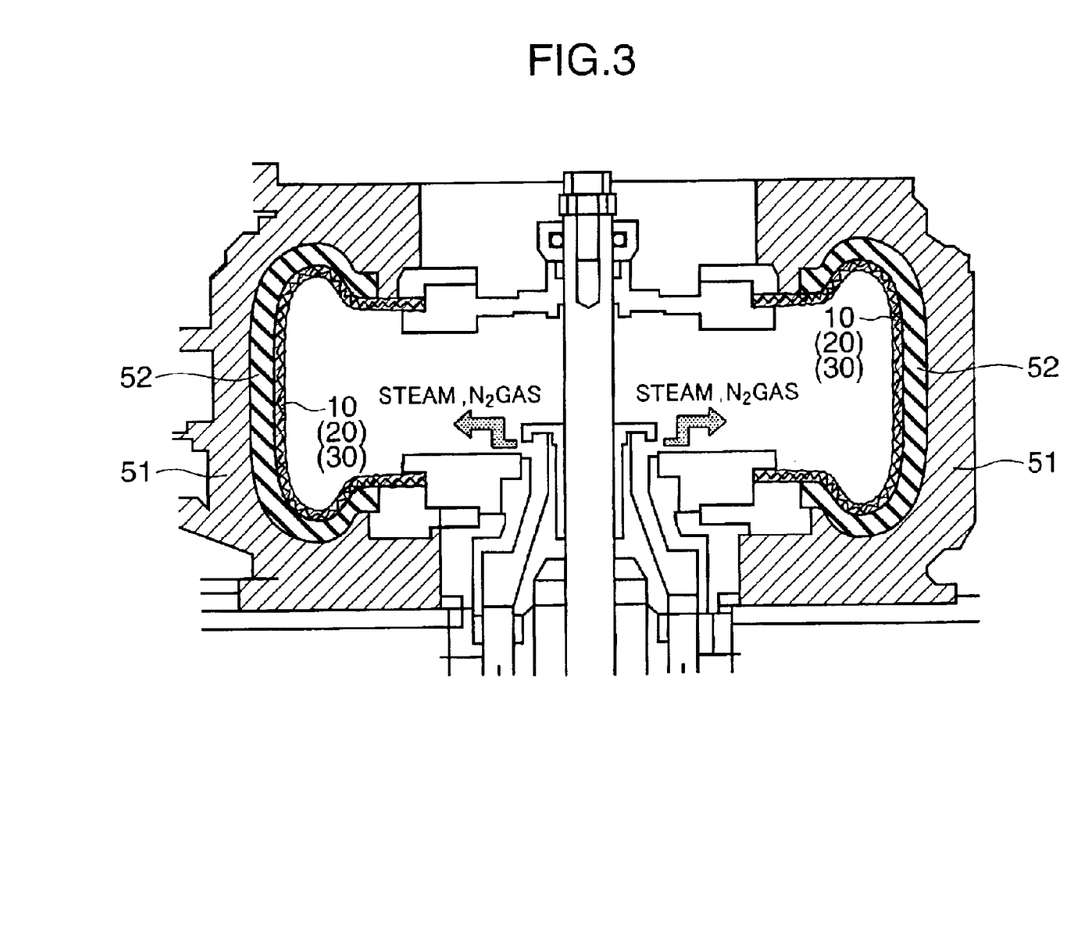
FIG. 3 is a section showing a state where the green tire is pressed against the mold by the bladder of the first example.

A method for vulcanizing a tire using the bladder 20 is similar to the one adopted for vulcanizing the tire using the bladder 10 of the first example (see FIGS. 2 and 3). In the bladder 20, the purl stitched fabric layer 12 is arranged at the mold side.

In the second example as well, since the bladder 20 satisfactorily elongates when a heating medium is supplied to the inside during vulcanization, there is hardly any variation in the profile along the inner wall surface of the tire. Further, since gas between the green tire 52 and the bladder 20 escapes to outside while being diffused through the unevenness of the purl stitched fabric layer 12, the inner wall surface of the tire can be pressed in a well-balanced manner. In addition, since the bladder 20 has a small thickness of 2 mm, heat of the heating medium supplied to the inside of the bladder 20 can be satisfactorily transmitted to the green tire 52. Thus, the green tire 52 can be vulcanized within a short period of time.

Third Example

A bladder 30 of a third example has a two-layer structure in which a silicon rubber layer is integrally placed on one surface of a circular knitted purl stitched fabric layer, and the thickness thereof is 2 mm (see FIG. 6). The purl stitched fabric layer is made by the circular knit of aramid fibers having a thickness of 440 dtex and a tensile strength of 25 cN/dtex at a course density of 15 courses/2.54 cm and a wale density of 15 wales/2.54 cm, and its elongation rate in warp direction, elongation rate in weft direction and weft/warp elongation rate ratio are 210%, 220% and 1.05. The bladder 30 of the third example is similar to that of the second example because having a two-layer structure, but different therefrom because having no seam in the purl stitched fabric.

Next, a method for producing the bladder 30 of the third example is described.

First, a silicone rubber is pressed to obtain a rubber sheet having a thickness of 2 mm. Subsequently, this rubber sheet is wound around a core and then a purl stitched fabric is placed on the rubber sheet, and the silicone rubber is arranged at a position corresponding to a clamping surface. Then, similar to the first and second examples, the core part is set in a lower outer mold, the upper and lower outer molds are clamped, and vulcanization is applied using a press. Thereafter, the upper and lower outer molds are opened to take the core portion out, and a bladder molded product is obtained by dividing the core section.

Although the two-layer sheet in which the purl stitched fabric and the rubber sheet are placed one over the other is first prepared and then formed into the bladder in the second example, the purl stitched fabric and the rubber sheet are formed into the bladder at the same time they are placed one over the other in the third example. The two examples differ in this point, but the final products of these examples have both a two-layer structure in which the purl stitched fabric is partially embedded in the rubber layer and a side thereof opposite from the embedded side is exposed to show the unevenness of the fabric (see FIG. 6). As described above, the purl stitched fabric layer of the third example has not seam and is uniform as a whole.

A method for vulcanizing a tire using the bladder 30 of the third example is similar to the one adopted for vulcanizing the tire using the bladder 20 of the second example (see FIGS. 2 and 3). Since the bladder 30 of the third example satisfactorily elongates, there is hardly any variation in the profile along the inner wall surface of the tire. Further, since gas between the green tire 52 and the bladder 30 escapes to outside while being diffused through the unevenness of the purl stitched fabric layer, the inner wall surface of the tire can be pressed in a well-balanced manner. In addition, since the bladder 30 is also thin, heat of the heating medium supplied to the inside of the bladder 30 can be satisfactorily transmitted to the green tire 52. Thus, the green tire 52 can be vulcanized within a short period of time.

(Experiment: Durability Test 1)

The durability of the bladders 10, 20, 30 of the first, second and third examples was tested. A testing method was such that operations (1) to (3) below as one cycle were repeated and the numbers of the repeated cycles until the bladders were broken were counted (vulcanization simulating test). It should be noted that a judgment on whether or not the bladders were broken was made by visual observation.

(1) Introduce steam of 185° C. and 14 kg/cm$^2$ into the bladders for 4 min.

(2) Then, introduce N$_2$ gas of 185° C. and 24 kg/cm$^2$ into the bladders for 6 min.

(3) Thereafter, release pressure and discharge the gas inside by suction for 1 min.

The same vulcanization simulating test was conducted for a bladder made of only a butyl rubber and having a thickness of 4 mm (comparative example 1) and a bladder made of only a silicone rubber and having a thickness of 2 mm (comparative example 2). The test result is shown in TABLE-1 in the attached sheets.

The comparative examples 1, 2 correspond to the prior art (1). As can be seen from the result shown in TABLE-1, the bladders 10, 20, 30 of the first, second and third examples have considerably better durability than the bladders of the comparative examples 1, 2.

Other Examples and Comparative Examples

Using fabric layers having various elongation rates as shown in TABLE-2 in the attached sheets, bladders were produced by integrally placing a rubber layer shown in TABLE-2 on one surface of each fabric layer. A specific bladder producing methods was the one adopted for the second example if the fabric layer is made by the flat knit while being the one adopted for the third embodiment if the fabric layer is made by the circular knit. The produced bladders Nos. 1 to 12 have each a two-layer structure in which the fabric layer is partially embedded in the rubber layer and a side thereof opposite from the embedded side is exposed to show the unevenness of the fabric layer (fabric). Any of these bladders Nos. 1 to 12 has a thickness of 2 mm.

TABLE 1

| | Bladder Materials | Bladder Thickness (mm) | # of cycles before breakage |
|---|---|---|---|
| 1st Example | Silicone Rubber + Aramid Fiber Flat Kitted Purl Stitched Fabric Layer (3-Layer Structure) | 2 | 950 |
| 2nd Example | Silicone Rubber + Aramid Fiber Flat Kitted Purl Stitched Fabric Layer (2-Layer Structure) | 2 | 1050 |
| 3rd Example | Silicone Rubber + Aramid Fiber Circular Kitted Purl Stitched Fabric Layer (2-Layer Structure) | 2 | 1200 |
| Comp Ex No. 1 | Butyl Rubber | 4 | 380 |
| Comp Ex No. 2 | Silicone Rubber | 2 | 450 |

(Experiment: Durability Test 2)

The durability of the bladders Nos. 1 to 12 was tested. A testing method was the same as in the aforementioned durability test 1, and the numbers of the repeated cycles until the bladders were broken were counted (vulcanization simulating test). It should be noted that a judgment on whether or not the bladders were broken was made by visual observation. The test result is shown in TABLE-3.

As can be seen from TABLE-2, the weft/warp elongation rate ratios of the bladders Nos. 1 and 12 are too small and too large, respectively. The durability of these bladders is thought to have been poor since a force is not uniformly exerted when these bladders are elongated by the supply of the heating medium during vulcanization. Further, both or one of the elongation rates in warp and weft directions are/is small in the bladders of Nos. 4 and 9. The durability of these bladders is thought to have been poor since an unnecessary force is exerted when these bladders are elongated during vulcanization.

Contrary to the above, the bladders Nos. 2, 3, 5 to 8, 10 and 11 have good durability. Among them, the bladders Nos. 3, 5 to 8 and 11 show better durability and the bladder No. 6 shows best durability.

Although the bladder and the tire producing method according to the present invention are described in detail above with reference to the drawings, the present invention is not limited to the shown examples and may be embodied by being suitably changed within the above scope and sprit. Such examples are all embraced by the technical

TABLE 2

| | Elongation Rate | | | | Fabric Layer | | | Stitched Density (/2.54 cm) | | |
|---|---|---|---|---|---|---|---|---|---|---|
| Bladder No. | Weft Elong Rate (%) | Warp Elong Rate (%) | Weft/Warp Elong Rate RATIO | Stitch Structure | Knit Profile | Fibers (thread) | Tensile Strength of Fiber (cN/dtex) | Course | Sales | Rubber Layer |
| 1 | 150 | 45 | 0.3 | Plain Stitch | Flat | Aramid | 23 | 15 | 15 | Silicone Rubber |
| 2 | 200 | 90 | 0.45 | Purl Stitch | Flat | PBO | 7.5 | 15 | 15 | Silicone Rubber |
| 3 | 200 | 110 | 0.55 | Purl Stitch | Circular | Aramid | 19 | 15 | 15 | Silicone Rubber |
| 4 | 10 | 13 | 1.3 | Plain Stitch | Flat | Aramid | 23 | 25 | 25 | Silicone Rubber |
| 5 | 15 | 22.5 | 1.5 | Purl Stitch | Circular | Aramid | 25 | 25 | 25 | Silicone Rubber |
| 6 | 200 | 230 | 1.15 | Purl Stitch | Flat | Aramid | 25 | 15 | 15 | Silicone Rubber |
| 7 | 200 | 230 | 1.15 | Purl Stitch | Flat | Aramid | 25 | 15 | 15 | Fluorocarbon Rubber |
| 8 | 200 | 230 | 1.15 | Purl Stitch | Flat | Aramid | 25 | 15 | 15 | Hydronitrile Rubber |
| 9 | 10 | 30 | 3.0 | Plain Stitch | Flat | Aramid | 23 | 25 | 25 | Silicone Rubber |
| 10 | 15 | 45 | 3.0 | Purl Stitch | Flat | Aramid | 25 | 25 | 25 | Silicone Rubber |
| 11 | 70 | 385 | 5.5 | Purl Stitch | Flat | PBO | 36 | 15 | 15 | Silicone Rubber |
| 12 | 50 | 350 | 7.0 | Rubber Stitch | Flat | Aramid | 23 | 15 | 15 | Silicone Rubber |

PBO: polyparaphenylene benzobisoxazole

TABLE 3

| Bladder No. | Bladder Thickness (mm) | # of cycles before breakage |
|---|---|---|
| 1 | 2 | 500 |
| 2 | 2 | 750 |
| 3 | 2 | 950 |

TABLE 3-continued

| Bladder No. | Bladder Thickness (mm) | # of cycles before breakage |
|---|---|---|
| 4 | 2 | 420 |
| 5 | 2 | 920 |
| 6 | 2 | 1050 |
| 7 | 2 | 900 |
| 8 | 2 | 850 |
| 9 | 2 | 430 |
| 10 | 2 | 720 |
| 11 | 2 | 880 |
| 12 | 2 | 480 | scope of the present invention.

For instance, the purl stitched fabric is used as the fabric layer in the bladders of the first, second and third examples. However, the fabric layer according to the present invention is not limited to the above and may be made, for example, by the plain knit, the rib knit or the like.

Since the inventive bladder hardly experiences any variation along the profile of the inner wall surface of the tire during vulcanization even after being used a large number of times for vulcanization, an exchange frequency of the bladder can be reduced and the bladder can press the tire well. Further, since the bladder can be made thinner, a vulcanization time can be shortened, leading to improved productivity and reduced production costs. Particularly in the case of using the fabric layer whose elongation rates in warp and weft directions are well-balanced, the bladder has good shape stability due to a small elongation anisotropy and can press the tire in a very well-balanced manner.

Since the inventive tire producing method is carried out using the inventive bladder as above, the tire pressed and vulcanized in a well-balanced manner can be obtained.

This application is based on patent application Nos. 2001-337319 and 2002-178271 filed in Japan, the contents of which are hereby incorporated by references.

As this invention may be embodied in several forms without departing from the spirit of essential characteristics thereof, the present embodiment is therefore illustrative an not restrictive, since the scope of the invention is defined by the appended claims rather than by the description preceding them, and all changes that fall within metes and bounds of the claims, or equivalence of such metes and bounds are therefore intended to embraced by the claims.

What is claimed is:

1. A bladder used to press the inner wall surface of a tire by means of a pressurized heating medium during the vulcanization of a green tire, comprising at least one rubber layer and at least one fabric layer, wherein elongation rates of the fabric layer in warp direction and in weft direction both exceed 15% and satisfy following equation (1):

$$0.4 \leq \text{elongation rate in weft direction/elongation rate in warp direction} \leq 6.0 \quad (1).$$

2. A bladder according to claim 1, wherein the elongation rates of the fabric layer in warp direction and in weft direction both exceeds 25%.

3. A bladder according to claim 1, wherein the fabric layer satisfies following equation (2):

$$0.5 \leq \text{elongation rate in weft direction/elongation rate in warp direction} \leq 1.7 \quad (2).$$

4. A bladder according to claim 1, wherein the fabric layer is made of a knitted fabric.

5. A bladder according to claim 4, wherein the knitted fabric is made by circular knitted stitches.

6. A bladder according to claim 4, wherein the knitted fabric is a purl stitched fabric.

7. A bladder according to claim 4, wherein the stitch density of the knitted fabric is 5 to 25 courses/2.54 cm and 5 to 25 wales/2.54 cm.

8. A bladder according to claim 1, wherein the fabric layer is made from high-strength fibers of 17 cN/dtex or higher.

9. A bladder according to claim 8, wherein the fabric layer is made from spun yarns made of high-strength fibers, false twist yarns made of high-strength fibers by a draft zone system spinning method or composite yarns of these yarns.

10. A bladder according to claim 8, wherein the high-strength fibers are aramid fibers.

11. A bladder according to claim 10, wherein the aramid fibers are copolyparaphenylen.3,4'-oxydiphenylene terephthalamide fibers.

12. A bladder according to claim 1, wherein the bladder has a three-layer structure in which rubber layers are provided on both surfaces of the fabric layer.

13. A bladder according to claim 1, wherein the bladder has a two-layer structure in which a rubber layer is provided on one surface of the fabric layer.

14. A bladder according to claim 1, wherein the fabric layer is embedded in the rubber layer.

15. A tire producing method, comprising the steps of:

placing a bladder inside a green tire set in a mold, and supplying a pressurized heating medium to the inside of the bladder to vulcanize the green tire while pressing it against the inner wall surface of the mold, wherein the bladder comprises at least one rubber layer and at least one fabric layer, and elongation rates of the fabric layer in warp direction and in weft direction both exceed 15% and satisfy following equation (1):

$$0.4 \leq \text{elongation rate in weft direction/elongation rate in warp direction} \leq 6.0 \quad (1).$$

* * * * *